Oct. 31, 1961
C. J. KENNEDY
3,007,102
SOURCE OF REGULATED VOLTAGE
Filed Feb. 14, 1958
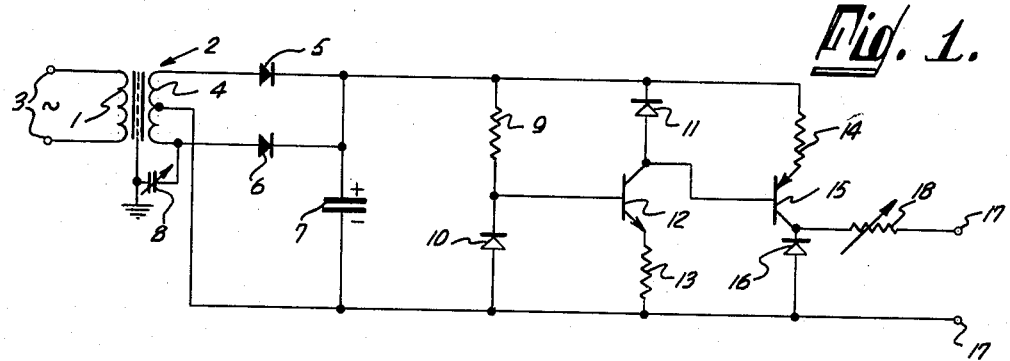
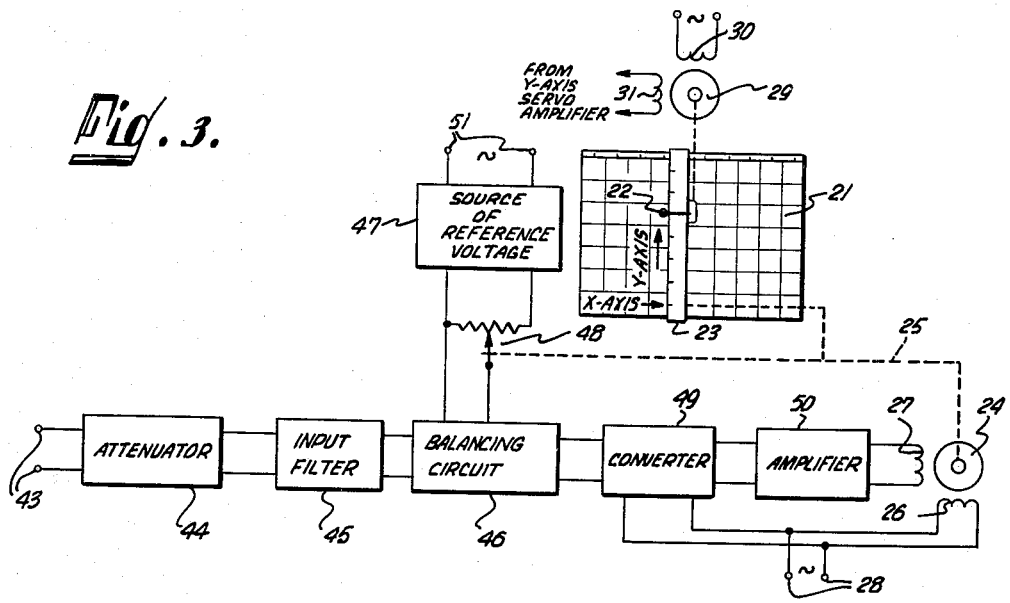
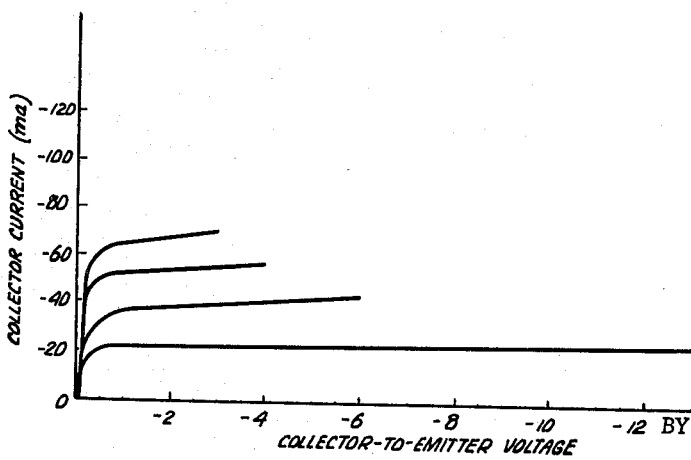
INVENTOR.
CHARLES J. KENNEDY
BY
Robert H. Fraser
ATTORNEY.

United States Patent Office 3,007,102
Patented Oct. 31, 1961

3,007,102
SOURCE OF REGULATED VOLTAGE
Charles J. Kennedy, Pasadena, Calif., assignor to F. L. Moseley Co., a corporation of California
Filed Feb. 14, 1958, Ser. No. 715,423
7 Claims. (Cl. 321—16)

This invention relates to a source of regulated voltage and more particularly to apparatus for generating a unidirectional voltage having a substantially constant value.

In power supply systems for generating a unidirectional (D.C.) voltage, it is well known to apply an alternating current wave to a rectifier to derive a unidirectional voltage from the alternating current wave. Generally, the value of a unidirectional voltage from such a power supply is affected by the amount of current drawn from the output, as well as by changes in amplitude of the alternating current wave.

In some types of electrical apparatus, variations in a unidirectional voltage from a source of supply cannot be tolerated. Accordingly, some mechanism must be provided for maintaining the unidirectional voltage at a substantially constant value. Although it is well known to connect voltage regulator devices, such as gas-filled electron tubes across the unidirectional voltage source which tend to maintain the unidirectional voltage constant, in some applications the requirements for regulation of a unidirectional voltage are such that a suitable unidirectional voltage can be derived only from an extremely constant source, such as a standard cell. For example, in servo systems which operate on the null balance principle, an input signal may be opposed to a balancing signal which is derived from an accurate voltage source of constant value. Servo systems of the null balance type are frequently employed as measuring and recording devices in which the value of an input signal is recorded by linking a marking element to the mechanism for varying the balancing voltage. Therefore, it is essential that the source of unidirectional voltage remain constant over relatively long periods of time to insure accurate measurement of the value of an input signal.

One of the disadvantages of using a standard cell as a source of constant unidirectional voltage is that the standard cell deteriorates with age with a consequent variation in the voltage provided. The result is that the standard cell must be replaced from time to time in order to insure a constant value of unidirectional voltage.

Accordingly, it is one object of the present invention to provide a new and improved source of regulated voltage.

It is an additional object of the present invention to provide apparatus for generating a unidirectional voltage having a substantially constant value from a source of alternating current.

It is still another object of the present invention to provide a reference voltage source which may be used in place of a conventional standard cell.

Briefly, in accordance with the invention, a fixed resistor, a current flow control device and a diode having a predetermined back voltage are connected serially across an unregulated source of unidirectional voltage, and the current flow control device is biased to pass a relatively constant current which produces a regulated unidirectional voltage across the diode.

In a particular embodiment, an alternating current wave is applied to a full wave rectifier to generate an unregulated unidirectional voltage. Connected in cascade to the rectifier is a voltage regulator having a plurality of sections, each of which comprises a fixed resistor, a transistor, and a zener diode connected serially. A relatively constant voltage appearing across the zener diode of each section except the last is applied to the transistor of a successive section so that a unidirectional voltage appears across the zener diode of the last section of substantially constant value.

A better understanding of the invention may be had from a reading of the following detailed description and an inspection of the drawings, in which:

FIG. 1 is a schematic circuit diagram of apparatus for generating a constant unidirectional voltage in accordance with the invention;

FIG. 2 is a graphical illustration of the relationship between the current flow through a transistor as a function of an applied voltage; and FIG. 3 is a block diagram illustrating the manner in which the apparatus of the invention may be incorporated in a servo system to function as a source of reference voltage.

In the apparatus of FIG. 1, an alternating current wave from a conventional power source may be applied to the primary winding 1 of a transformer 2 via the input terminals 3. The transformer 2 serves to isolate the remainder of the circuit from the power line as well as to change the voltage of the alternating current wave applied to the terminals 3 to a suitable value so that an alternating current wave of a selected voltage appears across a secondary winding 4 of the transformer 2.

Connected to the secondary winding 4 is a full wave rectifier comprising the diodes 5 and 6 which converts the alternating current wave to a unidirectional voltage. A capacitor 7 connected across the output of the full wave rectifier of the diodes 5 and 6 filters out unwanted alternating current components. In order to minimize the effect of the capacitance of the transformer 2, a small adjustable neutralizing capacitor 8 may be connected between the core of the transformer 2 and one side of the secondary winding 4.

Due to the combined action of the full wave rectifier of the diodes 5 and 6 and the filter capacitor 7, an unregulated unidirectional voltage is applied to a fixed resistor 9 and a diode 10 which are connected serially. The diode 10 is of a type which has a predetermined back voltage, such as a zener diode. Even though known types of zener diodes may be used to provide substantial voltage regulation due to the ability of the diode to sustain a relatively constant voltage over a range in variations of current flow therethrough, small variations in voltage do occur with changes in current flow. Thus, conventional zener diode regulated power supplies do not produce sufficiently constant well regulated unidirectional voltages for use in applications where a unidirectional voltage must be maintained constant for measurement purposes.

To achieve a regulated voltage of substantially constant value, the voltage regulator of the apparatus of FIG. 1 includes at least two sections, each of which comprises a fixed resistor, a transistor and a zener diode connected serially. The first voltage regulator section succeeding the fixed resistor 9 and zener diode 10 includes a zener diode 11 which is connected to the collector electrode of a transistor 12. Connected to an emitter electrode of the transistor 12 is a fixed resistor 13.

As illustrated in FIG. 2, a transistor voltage-current characteristic is such that the transistor tends to conduct a substantially constant current over a wide range of variation in voltage applied to the emitter and collector so long as the biasing voltage applied to the base is maintained constant at an appropriate value. Accordingly, the relatively constant unidirectional voltage appearing across the zener diode 10 is applied to the base of the transistor 12 so that the transistor 12 tends to conduct a substantially constant current irrespective of variations in the unregulated unidirectional voltage supplied by the full wave rectifier of the diodes 5 and 6.

As noted above, a zener diode tends to sustain a constant voltage over a variation of current flow therethrough, but a variation in current does produce a small variation in the voltage sustained. Therefore, in the first section of the voltage regulator of FIG. 1, a relatively constant voltage is applied to the base of the transistor 12 which tends to produce a constant current flow through the zener diode 11, which in turn tends to produce a constant unidirectional voltage across the zener diode 11.

Although in a particular embodiment of the invention any number of successive voltage regulator sections may be cascaded to produce the degree of regulation of the output voltage required, in the apparatus of FIG. 1 only one additional voltage regulator section is employed comprising a fixed resistor 14 which is connected to the emitter electrode of a transistor 15 and a zener diode 16 which is connected to the collector electrode of the transistor 15. By applying the substantially constant regulated unidirectional voltage appearing across the zener diode 11 to the base of the transistor 15 as a biasing voltage, the transistor 15 tends to conduct an extremely constant current which produces a very well regulated unidirectional voltage across the zener diode 16.

It will be noted that in successive sections of the voltage regulator of the circuit of FIG. 1, the transistors 12 and 15 may comprise opposite polarity types. For example, if the transistor 12 comprises a N-P-N type junction transistor, then transistor 15 may comprise a P-N-P type junction transistor. Thus, although the polarity of the unidirectional voltage appearing in each successive section is opposite to that appearing in the prior section, the selection of successive transistors of opposite polarity affords a means by which the unidirectional voltages appearing across each successive zener diode may be made to be better regulated than the unidirectional voltage appearing in the previous section.

For example, in the apparatus of FIG. 1, where a 115 volt, 60 cycle alternating current is applied to the terminals 3, having a voltage which varies plus or minus 10%, it has been found that an approximately 8 volt unidirectional voltage appears at the output terminals 17 which varies by only plus or minus .02% with 2 milliamperes of current being drawn from the output terminal 17. By means of a small variable resistor 18 connected serially between one of the output terminals 17 and the zener diode 16, the value of the voltage appearing at the terminals 17 may be adjusted to an appropriate value. Where the aforementioned degree of regulation of output voltage appearing at the terminals 17 is insufficient, practically any desired degree of regulation may be achieved by adding additional successive voltage regulator sections. Thus, by means of the apparatus of FIG. 1, there is provided a source of unidirectional voltage having a constant value over a range in variation of applied alternating current and output current.

The following circuit components values are given by way of example only, being indicative only of one workable embodiment:

| | |
|---|---|
| Transformer 2 | 115 volts–20 volts. |
| Diodes 5 and 6 | 1N91. |
| Capacitor 7 | 250 microfarads. |
| Capacitor 8 | 30–100 micro-microfarads. |
| Resistor 9 | 2200 ohms. |
| Zener diode 10 | 653C4. |
| Zener diode 11 | 650C3. |
| Transistor 12 | 2N169A (N-P-N). |
| Resistor 13 | 820 ohms. |
| Resistor 14 | 470 ohms. |
| Transistor 15 | 2N104 (P-N-P). |
| Zener diode 16 | 1N430. |
| Variable resistor 18 | 200 ohms. |

FIG. 3 illustrates one way in which the apparatus of the invention may be used as a source of reference voltage in a servo amplifier which is adapted to record the relationship between two independent variables by tracing a line on a graph.

Referring to FIG. 3, there is shown diagrammatically a graphical recorder having a bed 21 upon which may be placed a recording medium such as a piece of graph paper. Arranged to travel over the surface of the bed 21 is a pen 22. The pen 22 is carried on a movable carriage 23 which is adapted to move longitudinally of the bed 21. By movement of the pen 22 along the length of the carriage 23, the pen 22 may be moved to any location on the bed 21.

The longitudinal direction of the bed 21 is referred to as the X-axis of the recorder while the transverse direction of the bed 21 along the carriage 23 is referred to as the Y-axis of the recorder. By controlling the movement of the carriage 23 along the X-axis in accordance with one variable and controlling the movement of the pen 22 along the Y-axis in accordance with another variable, a graph may be traced on a recording medium supported by the bed 21 corresponding to the relationship between two independent variables.

The carriage 23 is positioned along the X-axis of the bed 21 from a servo drive motor 24 which is coupled to the carriage 23 by a mechanical linkage indicated diagrammatically by the dashed line 25. The servo motor 24 includes a pair of windings 26 and 27. One of the windings 26 is connected directly to a source of alternating current by means of the terminals 28. By applying an alternating current signal to the winding 27 having a predetermined phase relationship with respect to the alternating current wave applied to the winding 26, the motor 24 is caused to turn in a selected direction to position the carriage 23. In a similar fashion, the pen 22 may be positioned along the carriage 23 from a motor 29 having a pair of windings 30 and 31.

Input signals applied to the recorder are received via the terminals 43. A fractional portion of the input signal applied to the terminals 43 may be passed by an attenuator 44 to an input filter 45. The signal passed by the input filter 45 is applied to a balancing circuit 46 within which the input signal is balanced against a voltage which may be generated from a source of reference voltage 47 by means of a potentiometer 48 which is coupled to the motor 24 by a mechanical linkage indicated diagrammatically by the dashed line 25.

In a condition of balance the balancing voltage passed by the potentiometer 48 is substantially equal and opposite to the input signal and substantially no error signal is passed to a converter 49. However, upon a fluctuation in the input signal an error signal is passed to the converter 49 which functions to generate an alternating current signal of variable phase and amplitude corresponding to the polarity and magnitude of the error signal from the balancing circuit 46. The alternating current signal from the converter 49 bears a fixed phase relationship with respect to the alternating current wave applied to the terminals 28 since the converter 49 is energized by the alternating current wave applied to the terminals 28. Thus, an alternating current signal bearing a predetermined phase relationship to the signal applied to the terminals 28 and corresponding to the error signal is amplified by an amplifier 50 and applied to the winding 27 associated with the motor 24. The motor 24 is caused to turn in response to the amplified alternating current signal which repositions the carriage 23 until a condition of balance is restored in the balancing circuit 46 and no error signal is passed to the converter 49.

Although only one servo system for controlling the recorder is illustrated, it will be appreciated that the pen 22 may be moved along the length of the carriage 23 by the motor 29 from a servo system which is substantially identical to the one which is coupled to the carriage 23. For this reason, the drawing indicates that the winding 31 associated with the motor 29 may be connected to a Y-axis servo amplifier.

In the recorder of FIG. 3, the source of reference voltage 47 may be substantially identical to the circuit of FIG. 1. By applying an alternating current wave to the source via the terminals 51, a unidirectional voltage of constant value appears across the potentiometer 48 as a reference voltage. Since the alternating current wave applied to the terminals 51 may be derived from a conventional power line along with the alternating current wave applied to the terminals 28 for driving the motor 24 and converter 49, the apparatus does not require the usual standard cell as a source of reference voltage.

Although a specific circuit and application of the invention have been illustrated in FIGS. 1 and 3, the invention should be accorded the full scope of all alternative or equivalent arrangements falling within the scope of the annexed claims.

What is claimed is:

1. In a voltage regulator for deriving a regulated unidirectional voltage from a source of alternating current the combination of a rectifier for deriving an unregulated unidirectional voltage from an alternating current wave, a plurality of regulator sections, each of said sections including a transistor having a base, an emitter and a collector, a resistor connected serially with the emitter, a diode having a predetermined back voltage connected serially with the collector, means applying a relatively constant voltage to the base of the transistor of a first one of the sections, means applying a voltage appearing across the diode of at least one section to the base of the transistor of a successive section whereby a regulated unidirectional voltage appears across the diode of a last one of the sections which remains substantially constant over a range of variation in amplitude of the alternating current wave, a pair of output terminals connected across the diode of a last one of said sections, and a variable resistor connected between one of the output terminals and the diode of the last section whereby the value of the voltage appearing across the output terminals may be adjusted.

2. In a voltage regulator for deriving a reference voltage for use in the balancing circuit of a servo system the combination of a rectifier for generating an unregulated unidirectional voltage in response to an alternating current wave, a zener diode connected serially with the resistor across the rectifier for deriving a relatively constant unidirectional voltage across the zener diode, at least two voltage regulator sections connected across the rectifier, each of which comprises a transistor having a base, a collector and an emitter, a fixed resistor and a zener diode connected serially, means applying a voltage derived from the first named zener diode to the base of the transistor of the first section of the voltage regulator, means applying a voltage appearing across the zener diode of at least one of the sections of the voltage regulator to the base of a transistor of a successive section of the voltage regulator whereby a voltage appears across the zener diode of the last section of the voltage regulator which remains substantially constant over a variation in range of amplitude of alternating current waves applied to the rectifier, a pair of output terminals connected across the zener diode of the last section and a variable resistor connected between one of the output terminals and the zener diode of the last section whereby the value of the voltage appearing at the output terminals may be adjusted.

3. In a voltage regulator for use in a servo system the combination of a rectifier for generating an unregulated unidirectional voltage in response to an alternating current wave, a resistor, a zener diode connected serially with the resistor across the rectifier for deriving a relatively constant unidirectional voltage across the zener diode, at least two regulator sections connected across the rectifier, each of which comprises a transistor having a base, a collector and an emitter, a fixed resistor and a zener diode connected serially, means applying a voltage derived from the first named zener diode to the base of the transistor of the first regulator section, means applying a voltage appearing across the zener diode of at least one of the regulator sections to the base of a transistor of a successive regulator section whereby a voltage appears across the zener diode of the last regulator section which remains substantially constant over a variation in range of amplitude of alternating current waves to the rectifier, a pair of output terminals connected across the zener diode of the last section and a variable resistor connected between one of the output terminals and the zener diode of the last section whereby the value of the voltage appearing at the output terminals may be adjusted.

4. In a voltage regulator circuit responsive to a source of unregulated unidirectional voltage the combination of at least two sections connected in cascade across said unregulated source, each of which comprises a transistor having a base, a collector and an emitter, a resistor connected serially with the emitter, a diode having a predetermined back voltage connected serially with the collector, means applying a constant voltage to the base of the transistor of at least a first one of the sections, means applying a regulated constant voltage appearing across the diode of at least one section to the base of the transistor of a successive section whereby a regulated unidirectional voltage appears across the diode of a last section, a pair of output terminals connected across the diode of a last one of said sections, and a variable resistor connected between one of the output terminals and the diode of the last section whereby the value of the voltage appearing at the output terminals may be adjusted.

5. In a voltage regulator for deriving a regulated unidirectional voltage from a source of alternating current the combination of a rectifier for deriving an unregulated unidirectional voltage from an alternating current wave, a first transistor and a second transistor, each of said transistors having a base, an emitter and a collector, a first resistor coupled between one potential of said unregulated unidirectional voltage and said base of said first transistor, a first diode coupled between the other potential of said unregulated unidirectional voltage and said base of said first transistor, a second resistor connected between said other potential of said unregulated unidirectional voltage and said emitter of said first transistor, a second diode connected between said one potential of said unregulated unidirectional voltage and said collector of said first transistor, coupling means between said collector of said first transistor and said base of said second transistor, a third resistor connected between said one potential of said unregulated unidirectional voltage and said emitter of said second transistor, a third diode coupled between said other potential of said unregulated unidirectional voltage and said collector of said second transistor, a variable resistor coupled to said collector of said second transistor, and a pair of output terminals connected across said third diode through said variable resistor whereby the value of the voltage appearing at said output terminals may be adjusted.

6. The combination as defined in claim 5, wherein all of said diodes are of the zener type.

7. The combination as defined in claim 5, wherein said first and said second transistors are of opposite conductivity types.

(References on following page)

References Cited in the file of this patent

UNITED STATES PATENTS

| | | |
|---|---|---|
| 2,558,190 | Miller | June 26, 1951 |
| 2,558,945 | Fritzinger | July 3, 1951 |
| 2,693,568 | Chase | Nov. 2, 1954 |
| 2,751,550 | Chase | June 19, 1956 |
| 2,850,695 | Bishop | Sept. 2, 1958 |
| 2,892,165 | Lindsay | June 23, 1959 |
| 2,906,941 | Brolin | Sept. 29, 1959 |

OTHER REFERENCES

"Transistorized Regulated Power Supplies-11" by Hugh R. Lowry, published by Electronic Design (March 1, 1956), pages 32 through 35 relied on.